Patented Feb. 14, 1939

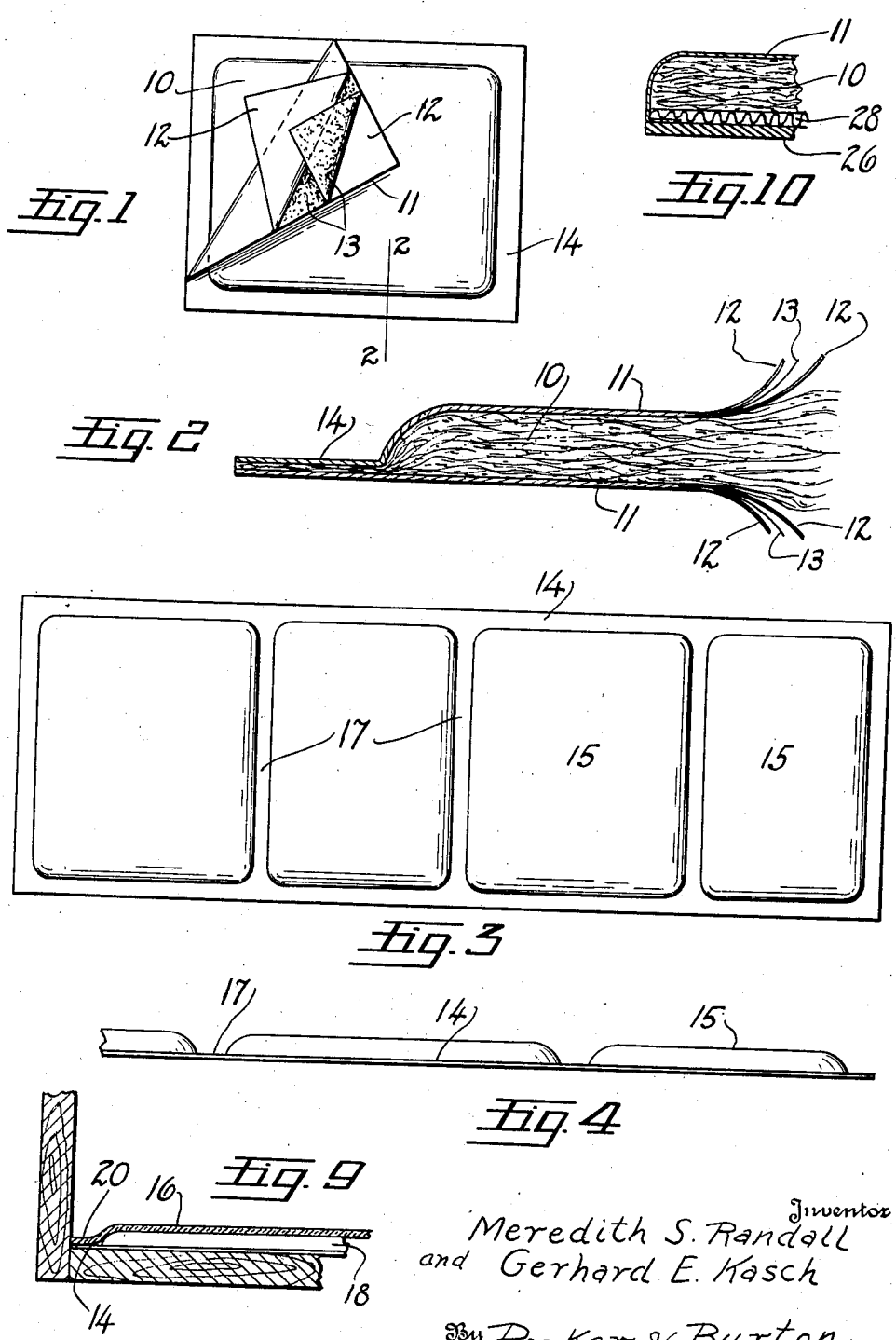

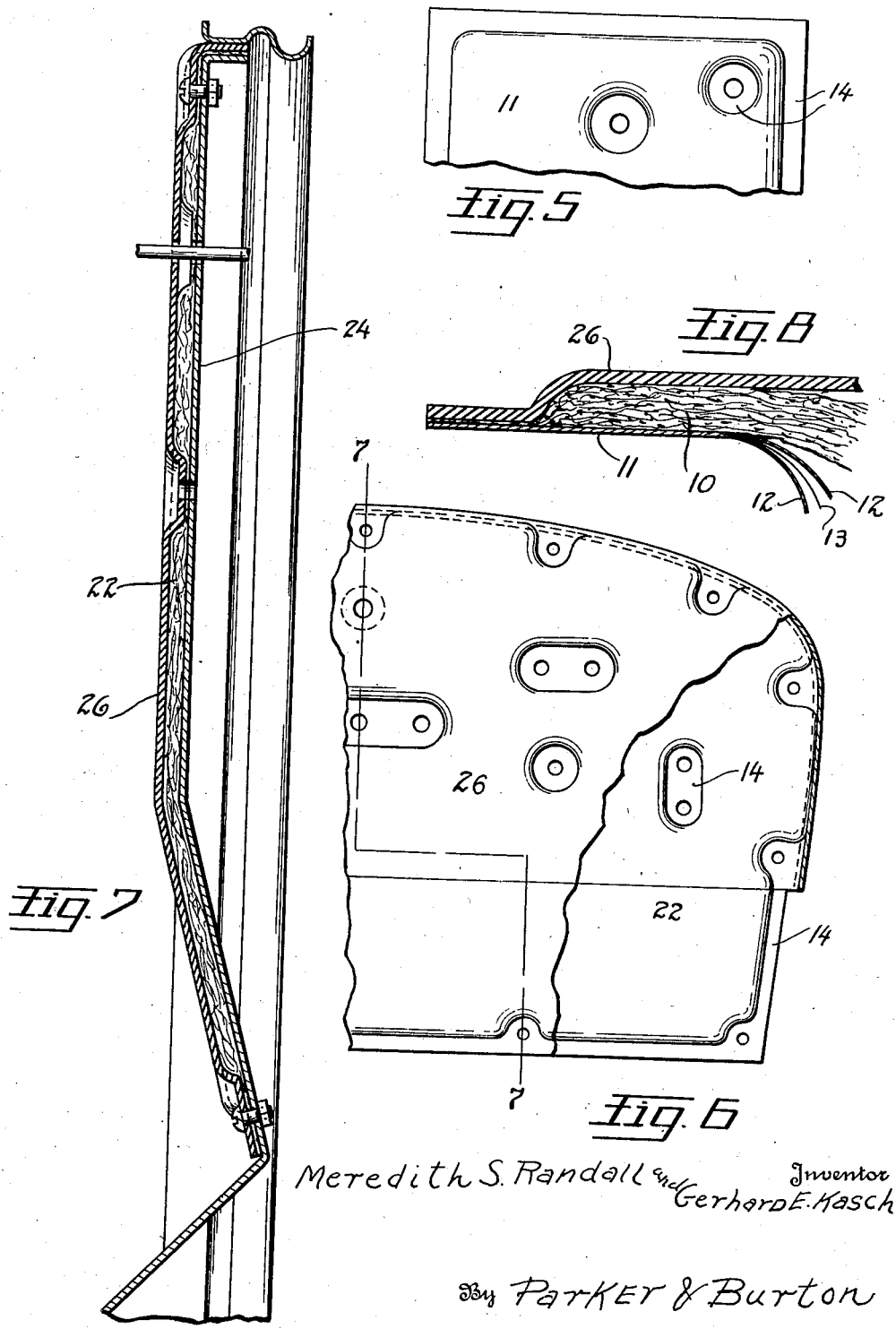

2,147,058

UNITED STATES PATENT OFFICE

2,147,058

LAMINATED MOISTURE RESISTANT INSULATING PANEL OR THE LIKE

Meredith S. Randall and Gerhard E. Kasch, Detroit, Mich., assignors to Woodall Industries Incorporated, Detroit, Mich., a corporation of Michigan Application December 20, 1934, Serial No. 758,420

12 Claims. (Cl. 154—44)

Our invention relates to laminated insulating moisture resistant structures such as panels or the like.

An object is to provide an inexpensive moisture resistant pad-like structure which possesses high insulating capacity, which is of a springy or spongy character and which is readily adaptable for fabrication into articles of widely varying type.

The laminated structure which forms the subject matter of the invention consists of inexpensive cellulose material possessing waterproof characteristics resulting from the presence of a suitable water resistant thermoplastic binder such as an asphalt product or the like. It is made up of a plurality of laminations of cellulose material each of which preferably possesses water resistant characteristics.

There is an internal lamination of downy fibrous material of a wadding or cushion-like character having very high insulating capacity and preferably possessing moisture resistant characteristics. A preferred form of this material is made up of a multiplicity of very filmy, almost cob-web like, fibrous layers which are loosely integrated together and throughout which asphaltum particles or other suitable adhesive thermoplastic particles are scattered. Arranged on each side of this internal lamination is an external protective lamination of tough flexible fibrous water resistant cellulose material carrying a thermoplastic product such as asphaltum. A preferred form for this protective lamination consists of two layers of crepe paper, which may be creped in one or two directions, secured together by an intervening layer of free asphalt or other suitable adhesive thermoplastic material which not only secures the layers together but renders them water resistant.

An internal lamination of the character described is arranged between two coterminous external protective laminations of the character set forth and the three laminations are compacted and compressed along a line surrounding an uncompressed area. Along this line the thermoplastic particles are coalesced and adhered together to form a sealed barrier about an uncompressed area within which air is sealed in the internal loosely integrated lamination and the loosely interlocked fibers of the internal lamination form a highly efficient springy insulating pad. The pad is moisture resistant.

Along the lines of compression the internal lamination is compacted and densified and the asphaltum particles therein contained are brought into adhesion and the free asphalt from the external layers migrates through the cellulose material and serves to hold the several layers together along the line of compression protecting and securing the internal lamination between the two external ones so as to preserve its normal fluffy character and insulating capacity.

A pad-like structure of this type is usable in many ways as it is not only of a high insulating capacity but is water resistant. It is readily adaptable for use as an insulation pad or layer capable of employment in various ways.

One meritorious embodiment illustrated is in a floor mat wherein such a pad is secured below an upper wear resisting layer of rubber or the like as illustrated.

Another meritorious embodiment is in an insulated dash panel wherein a pad of the character described is fabricated into the dash in combination with an outer protective semi-rigid finish layer and in such a manner that the structure when assembled upon a vehicle and provided with the necessary apertures and passageways therethrough provides a sealed area throughout substantially its entire expanse wherein the internal lamination is sealed between the external laminations at all points including the margin and all points of penetration of elements extending therethrough.

Various other objects, advantages and meritorious features will more fully appear from the following description, appended claims, and accompanying drawings, wherein:

Figure 1 illustrates a laminated structure embodying our invention,

Fig. 2 is a cross sectional fragmentary view taken on 2—2 of Fig. 1 showing the structure of the outer layers exaggerated to bring out the characteristics described, Fig. 3 illustrates the embodiment of the improved structure in an insulation blanket or pad capable of many uses, Fig. 4 is a side elevation of the pad or blanket shown in Fig. 3, Fig. 5 is an elevation of a fragment of our improved panel structure, Fig. 6 is an elevation of a fragment of an automobile dash embodying the invention, Fig. 7 is a sectional view taken along the line 7—7 of Fig. 6, Fig. 8 is a sectional view through a modification of the structure of Figs. 6 and 7, Fig. 9 is a cross-section through a pad embodying our invention in use with an automobile floor mat, and Fig. 10 is a sectional view through a modification of the construction of Figs. 6 and 7.

In the several figures the internal insulation lamination is indicated as 10. It comprises cellulose fibers such as are used in the manufacture of paper. It is a very downy and fluffy type of construction which preferably is formed of a multiplicity of filmy layers of tissue of cob-web like consistency which are loosely integrated together forming a resilient springy pad or cushion-like structure. Throughout this lamination there are scattered particles of thermo-plastic binder or adhesive such as an asphaltum product or the like. These small particles are scattered throughout the structure to hold the layers and fibers together and to render the same water resistant. A lamination of this material is arranged between two outer protective laminations.

The outer protective laminations are indicated as 11 and are also formed of fibrous water resistant material. This material is flexible and tough and extensible. It may be formed of two layers of paper 12, such as crepe paper, which may be creped in one direction or in the direction of both of its dimensions. Between these two layers of crepe paper is a layer of asphalt 13. In the drawings this asphalt layer is shown spread between the two paper layers as a separate layer, its separate character being exaggerated as in Figs. 1 and 2. Actually it may be spread over the adjacent faces of the paper layers 12 and these coated faces then brought together forming a relatively impervious asphalt layer between the two paper layers. This asphalt layer is preferably formed of free asphalt which will migrate readily under heat and pressure through the paper layers. Such a laminated product is exceedingly tough, strong and durable and water resistant and because of its character is readily extensible.

In making up the laminated pad the several layers are cut to size and the laminated structure is then subjected along its margin to heat and pressure sufficient to compact and compress the internal lamination as shown at 14 in Fig. 1. This lamination is so compressed that it is highly densified and the heat causes the asphalt to migrate from the two outer layers 11 and the asphalt particles in the several layers are coalesced and adhesively secured together so that this marginal portion forms a seal about the interior uncompressed area. If desired additional thermoplastic adhesive might be employed along the line of intended compression.

The air is retained in the internal lamination within the uncompressed area and serves to maintain the internal lamination in its initial fluffy resilient character. Such a structure possesses many uses. It is of high insulating capacity and it is waterproof throughout. It is inexpensive and yet the uncompressed portion of the internal insulating lamination is hermetically sealed and protected from moisture.

In Figs. 3 and 4 the structure is illustrated as embodied in an insulation pad or blanket formed as above described to provide a plurality of panels or sections 15 separated from each other by transverse lines of compression 17 extending between the two opposite compressed margins as shown. This pad may be flexed along the lines of compression to be bent around corners or the like, each separate section 15 forming a hermetically sealed area.

As shown in Fig. 9 it might be fabricated into a floor mat. The upper wearing lamination might be of rubber or the like as indicated at 16. This is secured to a coterminous cushion-like lamination formed as above described and indicated in Fig. 9 as 18. The upper rubber lamination which is coterminous with the pad has a free marginal portion 20 which falls down over the compressed marginal portion 14 of the pad as shown in Fig. 9 so that the floor mat snugly hugs the floor at its margin in a manner which is highly desirable in a structure of this kind.

In Figs. 6 and 7 of the drawings the laminated structure is shown as built into a dash panel. In the dash panel structure shown the pad is indicated generally as 22 and arranged adjacent to the sheet metal dash 24. Combined with the pad is an outer finish lamination which may be of any suitable finish material. A thermoplastic fibrous material commonly sold under the name of K B board which is capable of being shaped and embossed has been found suitable. This is indicated as 26. A pad such as 22 is shown in Figs. 1, 2, and 5. This comprises the internal lamination 10 and the two outer laminations 11 as heretofore described. Here it serves several desirable functions. It is highly efficient as an insulating medium. It is also readily compressible to conform to the irregular contour of the sheet metal dash against which it is juxtaposed.

This lamination 26 formed of K B board is of a fibrous character which carries a substantial content of bituminous material such as a colloidal asphalt product interspersed therethrough and possessing thermoplastic characteristics whereby the board may be embossed or otherwise finished. The pad is secured to the rear face of this board as shown. The same may then be embossed if desired and the marginal edge portion of the laminated pad 22 may be compacted and compressed so as to form a densified marginal seal about the internal lamination of the pad as has been set forth.

In utilizing the same in a dash panel it is necessary that various connections, rods, and other elements extend therethrough and in order to preserve the seal within the internal lamination and to accommodate these various penetrating elements, the pad structure is provided about each aperture with a selected area which is compacted and compressed so that the asphalt particles are coalesced throughout this area holding the two outer protective layers together and forming a barrier seal about the aperture.

This provides a dash panel which is of high insulating capacity. The lamination which is adjacent to the metal dash is of a cushion-like nature so that it will accommodate for irregularities of contours in such dash without destroying its insulating capacity.

If desired one lamination 11 may be omitted and the lamination 10 of loosely integrated insulating material placed adjacent to the K B lamination 26 as shown in Fig. 8. The lamination 10 is now sandwiched between the lamination 26 of K B board and the lamination 11 of the character heretofore set forth. These three laminations are then subjected to the heat and pressure treatment described in connection with the structures of Figs. 1, 2, 3, and 4. As a dash panel or in other uses this particular structure possesses substantially the advantages of the pad of Figs. 1 to 5 as the K B layer is moisture resistant and thermoplastic and eliminates the necessity of employing two laminations.

In Fig. 10 a second modified form is illustrated. In this embodiment, which might be a dash construction, in addition to the elements which make up the structure of Figs. 7 and 8, there is provided a relatively stiff, rigid, self-supporting layer of corrugated cardboard 28 or the like which lend support to the K B layer 26 and the cushion insulation layer 22. As shown this resembles the construction of Fig. 8 in that the layer of flexible extensible material 11 covers one side only of the wadding 10 and extends as shown over on to the opposite face of the cardboard between the cardboard and the K B board.

What we claim is:

1. A laminated structure comprising an internal resilient cushion-like lamination of fibrous wadding carrying asphaltum particles scattered therethrough securing the wadding fibers loosely together and arranged between two flexible fibrous protective elements each carrying asphaltum material, said three laminations being compacted and secured together throughout a selected area throughout which the internal lamination is permanently thermoplastically adhesively densified and compacted and throughout which compacted area the asphaltic particles of the three laminations are adhesively connected forming a continuous connective binder.

2. A laminated structure comprising an internal lamination of fluffy cushion-like fibrous wadding loosely integrated together and an external lamination of flexible protective fibrous material carrying an adhesive binder possessing thermoplastic characteristics overlying each side of the internal lamination, said three laminations being compacted and compressed together along a line surrounding an uncompressed area, said two external laminations being adhesively thermoplastically secured together through the internal lamination along said line forming a thermoplastically hermetic sealed barrier around said area, said internal lamination being impregnated with thermoplastic adhesive binder along said line, said binder holding the internal lamination in a compacted state along said line.

3. A laminated structure comprising an internal lamination of fluffy cushion-like material consisting of a plurality of filmy fibrous tissue-like layers loosely integrated together and carrying an asphaltum binder product and a protective lamination of fibrous material overlying each surface thereof, each protective lamination consisting of two flexible extensible fibrous layers secured together by an intervening layer of asphaltum material, said three laminations being compacted and adhesively thermoplastically compressed and permanently compacted together along a line surrounding an uncompressed area, said internal lamination being so compacted and densified along said line between the external layers as to be substantially impervious to the passage of air therethrough and being held permanently compacted by said binder.

4. A laminated structure comprising an internal lamination of loosely integrated fibrous wadding carrying thermoplastically adhesive asphaltic particles scattered therethrough and two protective moisture resistant air impervious external laminations of flexible fibrous material arranged one on each side of the internal lamination, each protective lamination consisting of two layers of crepe paper secured together by an intervening layer of thermoplastically adhesive asphaltum material, said three laminations being compacted and adhesively thermoplastically compressed together along a line through which the asphaltum material is integrated and surrounding an uncompressed area of the internal lamination, said layers being permanently compacted along said line to a point of densifying the internal layer to approximately the densification of the external layers and held in such compacted state by the adhesion of the compacted asphaltic particles.

5. A laminated panel structure including an internal lamination of loosely integrated fluffy fibrous insulating wadding carrying adhesive particles possessing thermoplastic characteristics adhering to the wadding fibers, a lamination of fibrous protective material carrying an adhesive binder possessing thermoplastic characteristics arranged adjacent each surface of the wadding, said three laminations being compacted and densified and permanently adhesively thermoplastically secured together by the adhesive integration of said particles and binder through compression along their margins hermetically sealing the insulation lamination between the two protective laminations and forming a dense tough moisture and air resistant marginal portion, said three laminations having a perforation extending therethrough and having a selected area surrounding said perforation compacted and densified and permanently adhesively thermoplastically secured together about said perforation hermetically sealing the insulation lamination between the external laminations about said perforation.

6. A laminated panel structure including an internal lamination of loosely integrated fluffy fibrous insulating wadding, a lamination of fibrous covering material arranged adjacent each surface of the wadding, said three laminations being compacted and densified and adhesively thermoplastically secured together along their margins by thermoplastic adhesive impregnating the wadding lamination between the covering laminations securing the covering laminations thereto and hermetically sealing the insulation lamination between the two covering laminations and an outer lamination of rugged protective finish material secured in overlying relationship adjacent to one of said covering laminations.

7. A laminated structure comprising a lamination of rigid self-supporting material, a lamination of tough fibrous asphalt impregnated, thermoplastic finish material secured to one side thereof, an insulation cushion formed of a layer of loosely integrated fibrous wadding provided with an overlying protective covering layer secured to the other side of the rigid lamination.

8. A laminated structure comprising an internal lamination of loosely integrated fluffy fibrous insulating wadding carrying asphaltic particles possessing thermoplastic characteristics, a lamination of fibrous protective material arranged adjacent each side of said internal lamination, said three laminations being compacted and permanently adhesively compressed and densified along their margins surrounding an uncompressed area sealing the three laminations together around said area and forming a compacted marginal portion, a tread lamination adhesively secured to one of said protective laminations overlying the same and having a free marginal portion overlying said compacted marginal portion.

9. A laminated panel comprising an internal lamination of loosely integrated fluffy fibrous insulation material arranged between two outer layers of tough asphalt impregnated fibrous protective material secured together at their margins enclosing the internal lamination, and a relatively rigid self-supporting panel lamination arranged adjacent to the internal insulation lamination and between the two outer protective layers and enclosed thereby.

10. A laminated structure comprising a layer of loosely integrated fluffy fibrous insulation material provided with a compacted densified marginal portion disposed within the same plane as the lower face of said layer, and a tough protective tread lamination adhesively secured to the upper face of said layer and having a free marginal portion falling loosely over the compacted marginal portion of said layer.

11. A laminated structure comprising an internal lamination of loosely integrated fibrous wadding arranged between two external laminations of fibrous protective material, said three laminations being compacted along the margin of the structure and said lamination of wadding being impregnated throughout said compacted marginal area with a thermoplastic adhesive holding the wadding permanently compacted together and holding the external lamination of protective material thereto and holding them together therethrough.

12. A laminated structure comprising an internal lamination of loosely integrated fibrous wadding arranged between two external laminations of fibrous protective material, each lamination having a heat fusible adhesive in solid form associated independently with the lamination, said three laminations being compacted together along a predetermined line with the heat fusible adhesive saturating the same along said line and holding them permanently compacted therealong.

MEREDITH S. RANDALL.
GERHARD E. KASCH.